3,364,065
HIGH TEMPERATURE REFLECTIVE AND THERMALLY PROTECTIVE COATINGS

Robert Clinton Cutright, Dayton, Ohio, assignor to the United States of America as represented by the Secretary of the Air Force
No Drawing. Filed Oct. 7, 1963, Ser. No. 314,567
2 Claims. (Cl. 117—135.1)

The invention described herein may be manufactured and used by or for the United States Government for governmental purposes without payment to me of any royalty thereon.

This invention relates to the protection of metals, plastics and the like, by a coating characterized by high light energy reflectance, even when exposed to high-temperatures and to the method for preparing and applying such coating.

The development of high-speed aircraft, thermonuclear reactions and the exploration of outer space not only have exposed personnel and their equipment to a broader range and greater intensity of radiant energy but also have added the environmental complication of such exposure at higher temperatures than had previously been encountered. The prior art has developed coatings, based primarily upon metal oxides as pigments which could adequately reflect or reradiate terrestrially encountered radiations such as sunlight.

Many of these prior art coatings have evinced substantially the same reflectance characteristics with regard to the more recently encountered conditions. It has been found that, once such coatings have been exposed to temperatures aboves 600° F., or 316° C., they have undergone optical changes resulting in a damaging loss of their reflectance capacity. Because the temperatures attending the heat build-up on the skin of high-speed aircraft or space vehicles departing or entering the earth's atmosphere, or of vehicles operating beyond the protective shield of this atmosphere, and because the temperatures of thermonuclear explosions inflicted upon nearby surfaces substantially exceed 600° F., it has developed that coatings have not been available to provide adequate protection in these situations. This has made it extremely difficult and costly, if not impossible, to provide protection, and thermal control under these newly encountered circumstances. Illustrative prior references are 3,100,154 Oshima et al. Aug. 6, 1963; and 2,944,919 Morris et al. July 12, 1960.

The physical and chemical stability required of materials capable of withstanding exposure to high concentrations of radiant and thermal energy has seriously limited the extent to which they could be modified to provide continuous, adherent protective films or coatings on otherwise desirable substrates with a variety of physical properties. For example, it has always been recognized as difficult to satisfactorily adhere a metallic oxide coating to a flexible substrate. Beyond this, adhesion of the prior art coatings to any substrate has been subject to premature deterioration upon exposure to elevated temperatures with the result that they prove to be unsatsifactory both because of their loss of reflectance and because of the disruption of the continuity of their adhesion to the object upon which they are applied.

It is accordingly an object of the present invention to provide protection from or control of radiant energy in high-temperature environments.

It is another object of the invention to provide such protection in the form of a high-temperature, high-reflectance coating.

It is a further object of this invention to provide such a coating, the adherence of which to a broad variety of substrates will withstand exposure to temperatures of on the order of from below room temperature to 1,500° F. or 816° C. and beyond.

Yet another object of the present invention is to provide such a coating, the reflectance of which will not be substantially affected by exposure to such high temperatures.

Still another object of the present invention is to provide a method for the preparation and application of such coatings to various objects as substrates.

To achieve these and other objects and advantages of the invention which will be apparent from a reading of the following disclosure, it is provided here that certain of the rare earth oxides be employed as pigments. More specifically, it is provided that such rare earth oxides be incorporated in continuous, adherent films or coatings by their admixture with and dispersal through a suitable organic or inorganic binder or vehicle which is itself capable of withstanding high temperature exposure while maintaining continuous adherence to a substrate.

While the discovery of the retention of high-reflectance characteristics through temperatures beyond 1,500° F. is applicable to the oxides of samarium, europium, gadolinium, dysprosium, thulium, yttrium, cerium, lanthanum, ytterbium, and lutecium, particularly improved coatings, from the standpoints of film continuity and adherence to the substrate, even under flexure, as well as the maintenance of high reflectance under high temperature exposure have been achieved where the reflecting pigment has comprised one or more of that particular class of the rare earth oxides consisting of lanthanum oxide, gadolinum oxide and dysprosium oxide.

While these pigments appear to give improved reflectance in combination with a variety of organic or inorganic binders, particularly desirable coatings according to the previously discussed standards have been provided where one or more of the rare earth oxides is incorporated with a silicate powder or water solution and particularly those wherein the ratio of the oxide of sodium or potassium to the silicon dioxide is within the range of from 1:1.60 to 1:3.75.

Silicones, as well as silicates are useful as binders according to the teachings of this invention and polyphenylmethylsiloxanes, typified by Dow Corning 808 or 806A resins sold under such names by the Dow Corning Corporation, Midland, Mich., have been advantageously used. While even a nominal amount of any of these pigments will provide some improvement, it has been found that a striking gain in reflectance over the broad temperature ranges results where the weight proportion of the pigment to the binder, hereinafter referred to as the pigment-to-binder ratio, is one-half to one or more. On the other hand, it has been found that additionally improved reflectance characteristics are not achieved where the pigment-to-binder ratio exceeds six to one.

Because the refractive index of the rare earth oxides is very low as compared to that of the prior art metal oxides such as titanium dioxide, they do not reflect radiation with wavelengths within the visible band as well as comparable amounts of titanium dioxide or other pigments that have been used; and this is perhaps one of the reasons that the use of the rare earth oxides as radiant reflectors or reradiators has not been suggested or employed by the prior art. Because of this relatively lower index of refraction, the rare earth oxides do not have great hiding or covering power; and normal coating applications require a higher pigment-to-binder ratio than is necessary for pure reflectance over the entire radiation spectrum.

Preferred coatings should therefore have a pigment-to-binder ratio in the range of from 2:1 to 6:1. Where the binder comprises a volatile liquid or the like, the weight ratio is based upon the solids content of the binder. The composition is assembled and is applied to the substrate at about laboratory conditions of temperature and pressure, which may be taken as 22° C. and one atmosphere of pressure.

In the preparation of coatings according to this invention the pigment and binder are admixed either in a pebble mill or a suitable stirring, blending or mixing device, usually until the mixture become flowable, whereupon it may be applied to the substrate such as a metal, e.g., clad aluminum or steel, by spraying, brushing, immersion, draw-down or other conventional coating expedients, and the coated substrate may then be subjected to vulcanizing, curing or drying conditions of heat or pressure during which the film will become permanently set and will adhere to the substrate.

While a broad range of curing conditions are available and most pigment-binder mixtures can be "air cured" if allowed to stand for a sufficient length of time at room temperature or above, it is generally preferred that the curing environment involve exposure for some substantial length of time, say for at least 45 minutes, to a relatively high temperature on the order of at least 400° F. of 204° C.

To improve the hiding power of the coating mixture and achieve some modification of the physical properties thereof for particular applications, extenders in the form of titanium dioxide or zirconium dioxide may be admixed with the pigment either at or before its incorporation with the binder in a weight ratio of from one-half to one part of the extender for one part of the pigment.

The nature and degree of the improvements achieved by this invention are demonstrated by the following specific examples and test data. Coatings according to the formulations given were applied by draw-down to a stainless steel substrate and cured according to the conditions indicated whereupon the coated substrate was exposed to elevated temperatures and the reflectance was recorded periodically thereafter. The reflectance was determined on a Bausch and Lomb Spectronic 505 Double-Beam Recording Spectrophotometer measuring total integrated reflectance of wavelengths of the range of from 0.4 to 0.7 micron with the reflectance of this range from magnesium carbonate as a standard of 100%.

*Example 1*

Dysprosium oxide ($Dy_2O_3$) and Dow-Corning 808 silicone resin were mixed together in a pigment-to-binder ratio of four to one and milled for 20 hours and 45 minutes. After application of this coating to the stainless steel panel, the composite was cured for one hour at 150° F. or 66° C., for one hour at 350° F. or 177° C. and for one hour at 400° F. or 204° C. The initial reflectance; i.e., after cue but prior to exposure to elevated temperatures was 92.2%; and, after exposure to 800° F. or 427° C. for one hour, three hours and five hours, the reflectance was 90.9%, 86.6% and 86.3%, respectively.

*Example 2*

A second substrate coated with the same formulation was exposed to 1,000° F. or 538° C for 16 hours after which the reflectance was 91.3%. When this same substrate was exposed for and additional 17 hours to 1,500° F., the reflectance as could be determined visually remained very high; but cracking of the coating prevented an accurate spectrophotometer reading.

*Example 3*

Still another coating of the same ingredients but with a pigment-to-binder ratio of six to one was cured the same as the above examples except that the curing time at 400° F. was reduced to 45 minutes. This coating, which had an initial reflectance of 93.1% was exposed to 800° F. for one hour, three hours, and five hours and the reflectance was maintained at 91.5%, 92% and 91%, respectively.

A second substrate of this same formulation and cure was exposed to 900° F. for 17 hours after which the reflectance was 92.4%. A third substrate of the same formulation and cure was then exposed for 16 hours to 1,000° F. after which the reflectance remained at 91.1% and after 17 hours additional exposure of this same substrate to 1,500° F., the reflectance remained visually high although slight crazing had occurred.

Substitution of the oxides of gadolinium and lanthanum for the dysprosium oxide in the above examples resulted in coating formulations giving substantially the same results. Further testing of these coatings on a Perkin-Elmer Model 13 Spectrophotometer using polished aluminum as a standard and measuring reflectance in the wavelength range of from 1 to 15 microns disclosed that the highest reflectance percentages are achieved as to wavelengths from 1 to 3 microns although reflectance of the longer wavelengths was substantially less.

Where extenders such as the zirconium oxide were used in weight ratios of from one to one to one-half to one based upon the rare earth oxide, the retention of high reflectance was surprisingly not noticeably less upon exposures to elevated temperatures although the initial reflectance of these compounds was not quite as high as those employing the rare earth oxides only. Similarly, tests of coatings employing cerium oxide with a pigment-to-binder ratio of four to one in the same binder and exposed to the same cure showed a somewhat lower initial reflectance of 71.0% while exposure of the same to 800° F. for one hour, three hours and five hours indicated an actual increase in reflectance to 75.4%, 74.8% and 75.6%, respectively. While ytterbium oxide exhibited a substantial improvement in the retention of reflectance, it was not as great as was the case with the other rare earth oxides above mentioned.

When the above listed results are compared with the fact that the prior art pigments such as titanium dioxide, zinc oxide, basic lead carbonate and others have an upper temperature exposure limit of 600° F. for five hours with retention of only 80% reflectance relative to a magnesium carbonate standard, it can be seen that substantial improvements are achieved by the coatings of this invention. To the extent that temperatures beyond 600° F. are only on the threshold of the high temperatures being encountered in our advancing space and thermonuclear explorations, it follows that the improvements provided by this invention are of critical importance to a continuance of these advancements.

While this invention has been described in considerable detail in connection with certain preferred embodiments thereof, it is to be understood that the foregoing particularization and detail have been for the purposes of illustration only and do not limit the invention as it is more precisely defined in the subjoined claims.

I claim:

1. A method of making a coating material characterized by high reflectance at temperatures in excess of 600° F. for extended periods of time comprising the steps of (1) combining and mixing to a desired consistency about one-half part to six parts of a pigment selected from the group of rare earth oxides consisting of yttrium, lanthanum, cerium, samarium, europium, gadolinium, dysprosium, thulium, ytterbium, and lutecium oxides with about one part of a binder selected from the group consisting of sodium silicate, potassium silicate and a silicone resin; (2) applying said mixture of pigment and binder to a metal, and (3) heat curing said pigment and binder so as to form a coating which is bonded to said metal.

2. The process defined by the claim 1 wherein the curing step is accomplished by heating the coated metal at about 400° F. for about 45 minutes.

References Cited

UNITED STATES PATENTS

| | | | |
|---|---|---|---|
| 3,142,655 | 7/1964 | Bobear | 260—37 |
| 1,698,302 | 1/1929 | Goss | 117—135 X |
| 2,743,192 | 4/1956 | White | 117—132 X |
| 2,901,379 | 8/1959 | Shannon | 117—169 X |
| 3,100,154 | 8/1963 | Oshima | 106—57 |
| 3,148,280 | 9/1964 | Kleber et al. | 250—108 |

WILLIAM D. MARTIN, *Primary Examiner.*

P. F. ATTAGUILE, *Assistant Examiner.*